United States Patent [19]

Melchior

[11] 3,996,748
[45] Dec. 14, 1976

[54] SUPERCHARGED INTERNAL COMBUSTION ENGINES
[75] Inventor: Jean Melchior, Paris, France
[73] Assignee: Etat Francais, Paris, France
[22] Filed: May 13, 1975
[21] Appl. No.: 577,039
[30] Foreign Application Priority Data
   May 15, 1974   France .............................. 74.16756
[52] U.S. Cl. .................................. 60/614; 60/615; 60/606
[51] Int. Cl.² ........................................... F02G 3/00
[58] Field of Search ............ 60/614, 615, 509, 606, 60/608, 617, 619

[56] References Cited
UNITED STATES PATENTS 2,580,591   1/1952   Pouit ................................. 60/614
2,608,051   8/1952   Nettel ................................. 60/606

*Primary Examiner*—Ronald H. Lazarus
*Attorney, Agent, or Firm*—Barnes, Kisselle, Raisch & Choate

[57] ABSTRACT

For improving idling and low load operation of a low compression supercharged combustion engine provided with a continuously open bypass at low ambient temperature, recycling of exhaust gas is provided. A branch pipe recycles part of the combustion gas delivered by an auxiliary combustion chamber fed by the bypass to the driven gas inlet of an ejector diffuser located between the compressor and the intake manifold of the engine.

16 Claims, 8 Drawing Figures

SUPERCHARGED INTERNAL COMBUSTION ENGINES

BACKGROUND OF THE INVENTION

The invention relates to power units including an internal combustion engine, and more particularly a Diesel engine having a low compression ratio, supercharged by a supercharging turbocompressor unit comprising a turbine which, when the engine is in operation, receives the exhaust gases thereof, the compressor outlet being connected to the turbine inlet by bypass means disposed parallel to the engine, permanently open in operation and arranged to pass that portion of the compressed air delivered by the compressor which is not absorbed by the engine with a head loss which, if appreciable, is substantially independent of the ratio of the flow rate traversing said bypass means to the air flow delivered by the compressor, and an auxiliary combustion chamber having an adjustable fuel supply being disposed upstream of the turbine.

In internal combustion engines of the afore-mentioned type, the provision of the bypass means renders it possible to operate the turbocompressor near its surge line, i.e. with very high efficiency, which is particularly important for Diesel engines operating with a high supercharging pressure and a low compression ratio (typically lower than 12).

Starting and low-load operation of engines of the aforementioned type presents problems when the ambient temperature is low. These problems are particularly acute with Diesel engines having a low compression ratio (e.g. below 12).

The difficulties resulting from very low external temperatures can be overcome by heating the air fed to the engine, for instance by increasing the compression of the air supplied by the compressor, which involves increasing the amount of fuel injected into the combustion chamber disposed upstream of the turbocompressor turbine. This method, however, increases the fuel consumption.

By way of example, in the case of a 3000 hp engine having a compression or volumetric ratio of 7, starting and idling are easy if the temperature of the air supplied to the engine is 110° C. If the ambient temperature is −30° C, a compression ratio of 3.5 is required for heating to 110° C by adiabatic compression (efficiency 0.75) of the air in the compressor. This ratio can be obtained if fuel is introduced into the combustion chamber at a rate of 140 liters per hour.

The operating parameter determining good starting and proper idling is the time delay before the air-fuel mixture ignites in the engine combustion chambers at the end of the compression stroke; this time depends mainly on the air temperature and, to a lesser extent, on the pressure. For example, the same time delay before ignition can be obtained with 3.5 bars and 110° C or with 1.7 bars and 150° C.

If, however, the ambient temperature is −30° C and if the air is heated only by adiabatic compression in the compressor, the temperature of air delivered at 1.7 bars will be 23° C only. If, furthermore, the head loss between the compressor and the turbine is 15% of the pressure delivered by the compressor, the temperature of the hot gases supplying the turbine will have to be 402° C for the turbocompressor to be able to operate independently.

The air fed to the Diesel engine can be economically reheated by recycling part of the gas leaving the combustion chamber towards the engine intake. The recycled gas is mixed with the air supplied by the compressor at, e.g., 23° C. Under the above conditions, it is sufficient to recycle 45% of the mass flow of hot gas at 402° C into the air supplied by the compressor and to introduce fuel at the rate of 40 1/hr into the combustion chamber. The fuel saving is due to the fact that the heat in the flow of recycled hot gas is completely recovered. The bulk of flowing gas acts like a reserve storage of heat flowing in the bypass and only raises the temperature of the overall gas body in which engine intake and exhaust occur.

This saving is particularly important for engines which have to operate for long periods under idling or low-load conditions, e.g., marine engines driving a constant-pitch propeller which absorbs 12% of the maximum power at half the maximum speed and about 2% of maximum power at one-quarter the maximum speed.

Heating of the compressed air delivered to an engine by recycling hot gases has been used hitherto for a long time. However, recycling presents substantial additional problems when the compressor outlet is connected to the turbine inlet by continuously open bypass means disposed in parallel relation with the engine, particularly if throttle means are disposed in the bypass as disclosed in copending U.S. application Ser. No. 437,748, filed Jan. 29, 1974, in the name of Jean F. Melchior, applicant herein. Such throttle means and the resulting pressure drop are for satisfactory scavenging of the engine cylinders, which is essential in the case of a two-stroke engine.

It is known to recycle the exhaust gas by connecting the exhaust of the turbocompressor turbine to the compressor intake by a pipe (U.S. Pat. No. 2,633,698). However, large volumetric rates of flow are involved and the engine assembly should have a special suction and delivery-pipe installation.

U.S. Pat. No. 3,149,454 describes an engine which may operate either as a Diesel engine or as a gas engine, which is supercharged by a turbocompressor unit and which is devoid of any bypass conduit and auxiliary combustion chamber. A venturi nozzle is located between the output of the compressor and the intake of the engine for recycling part of the engine exhaust gas to the intake when the engine operates idle on gaseous fuel. Such recycling, if retained for Diesel engine operation, is entirely unsatisfactory. If an attempt is made to accelerate the idle engine, the fuel delivery to the engine is abruptly increased. That fuel is not completely burnt and is partly found in the partly recycled exhaust gas. White polluting smoke appears at the output of the exhaust pipe. The recycled exhaust gas still increases the richness in the engine combustion chamber and only renders combustion less satisfactory. It is well known that the time delay for ignition increases if the richness is excessive: if in spite of the poor combustion efficiency the speed of the engine tends to increase, the time delay for ignition corresponds to a crank angle which increases and may become greater than the angle at which the exhaust valves open. As a result, it would generally not be possible to increase the speed from idle under such conditions.

Still, since the pressure at the exhaust of an internal combustion engine oscillates and exhibits a peak at the beginning of the exhaust discharge, recycling can only be pulsed and consequently unsteady.

SUMMARY OF THE INVENTION

According to the invention, there is provided a power unit comprising: an internal combustion engine having variable volume combustion chambers; a turbocompressor supercharging unit having a compressor and a turbine, the inlet of said turbine being connected to receive the exhaust gas of said engine; continuously open bypass conduit means having an inlet and an outlet connected to flow the air delivered by said compressor and not drawn by the engine to the inlet of said turbine with a pressure loss which, if appreciable, is substantially independent of the ratio of the flow rate traversing said bypass conduit means to the air flow delivered by the compressor; an auxiliary combustion chamber connected to the outlet of said bypass conduit means and to the exhaust of said engine and having an output connected to the inlet of said turbine; ejector-diffuser means having a driving gas inlet connected to the outlet of said compressor to receive the total air flow from said compressor, a driven gas inlet and an outlet connected to the intake of said engine and to the inlet of said bypass conduit means; branch pipe means connected between the outlet of said auxiliary combustion chamber and said driven gas inlet of said ejector-diffuser means; and means for adjusting the ratio between a cross-sectional area on the driving gas flow path and a cross-sectional area in said branch pipe means.

The ejector produces a local pressure decrease in the pipe supplying air to the engine and to the bypass. That decrease is determined for the pressure to be lower than the pressure at the inlet of the branch pipe, so that transfer of a proportion of the hot gases from the combustion chamber need not pumping means. The diffuser then raises again the pressure of the mixture of air from the compressor and hot recycled gases, to a value greater than the pressure at the engine exhaust.

The invention may be used in power units whose bypass does not produce an appreciable pressure drop as well as when a throttle means is disposed in the bypass so that there is a considerable pressure difference between the engine intake and exhaust, so as to provide good scavenging which is essential for two-stroke engines and is also useful for four-stroke engines, inter alia high-power four-stroke engines.

Advantageously, adjusting means are provided for adjusting the ratio between the driven flow (or induced flow) of hot gases and the driving flow of fresh air supplied by the compressor. Typically, the adjusting means are designed so as to vary the ratio between the driven flow and the driving flow between a maximum value and a zero value, the maximum value of the ratio and the value of the supercharging pressure corresponding to the zero value of the ratio being set at values which are higher if the ambient temperature is lower.

Last, the unburnt hydrocarbons which may be present in the exhaust gas of the engine are burnt in the auxiliary combustion chamber and cannot be re-injected into the engine, so that they cannot render the richness excessive.

The invention will be better understood from the following description and accompanying drawings, both the description and the drawings relating to particular embodiments of the invention given as examples only.

Figure 1:
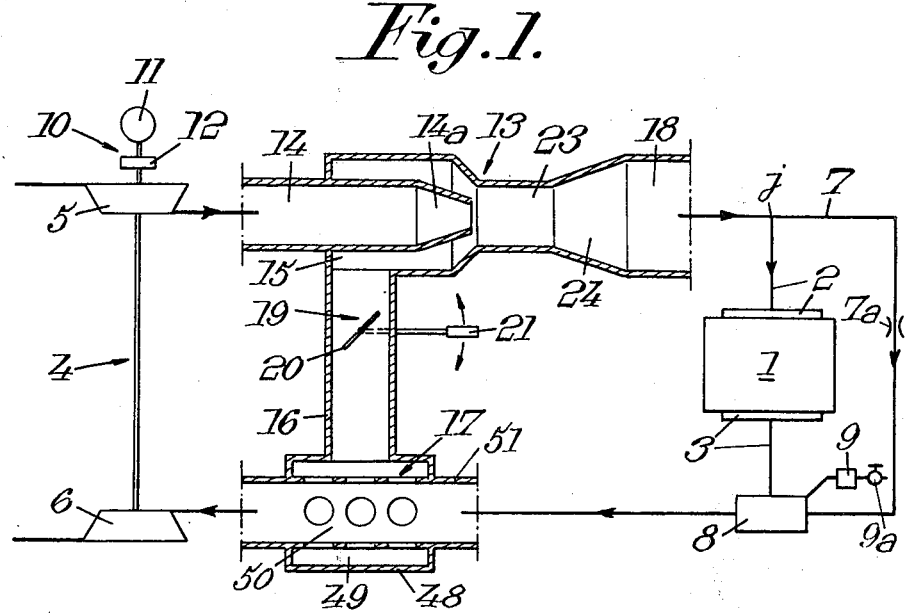
FIG. 1 is a diagram of a power unit according to a first embodiment.

Referring to the drawings, the power unit includes a diesel engine 1, which preferably has a low compression ratio (less than 12), having an intake manifold 2 and an exhaust manifold 3. It is supercharged by a turbocompressor unit 4 comprising a compressor 5 and a turbine 6 which drives compressor 5 and is actuated by the engine exhaust gases. The supercharging pressure can reach or even exceed 8 bars.

A bypass conduit 7 connects the outlet of compressor 5 to the inlet of turbine 6 and is disposed in parallel relation with the motor, so as to be continuously traversed by that portion of the compressed air flow delivered by the compressor and not absorbed by the engine. The bypass 7 typically is provided with throttle means 7a as described, e.g., in U.S. patent application Ser. No. 437,748 and U.K. patent application No. 73/15992. An auxiliary combustion chamber 8 is disposed upstream of turbine 6 and is supplied with fresh air via bypass 7, with exhaust gases from exhaust manifold 3 and with fuel delivered by adjustable supply means 9, 9a.

Starting means 10 may be provided for starting the turbocompressor unit 4 before engine 1 starts. The starting means 10 can comprise an electric motor 11 coupled to the shaft of unit 4 by a clutch 12.

An ejector-diffuser device 13, 24 is provided between the compressor 5 and the junction j between the intake header 2 and the bypass. The ejector-diffuser has two inlets and one outlet, i.e.:

an air inlet 14 connected to the compressor outlet 5, the air supplied by compressor 5 forming the driving flow of the ejector-diffuser 13, 24 a hot-gas inlet 15 connected by a branch pipe 16 to a gas intake 17 disposed between the combustion chamber 8 and turbine 6, the hot gases travelling along branch 16 forming the driven or induced flow of the ejector 13, and a mixture outlet 18 connecting the diffuser 24 to junction j, the flow along outlet 18 comprising a mixture of fresh air and hot gases at a temperature greater than that of the fresh air delivered by compressor 5 and having a total pressure at least equal to or preferably greater than the pressure in the exhaust manifold 3 of engine 1.

If, as illustrated, the bypass comprises throttle means 7a, there is a substantial pressure difference in operation between the engine intake and the exhaust, thus ensuring efficient scavenging of the combustion chambers of engine 1.

The ejector-diffuser device 13 comprises an intake nozzle 14a terminating in a mixture region 23 followed by a divergent diffuser zone 24 opening to the mixture outlet 18.

Adjusting means 19 may advantageously be provided for adjusting the ratio between the induced flow and the driving flow. In the embodiment shown in FIG. 1, the adjusting means 19 comprise throttle means 20 having a variable flow cross-sectional area. Means 20 can be actuated by an operating means 21 and are disposed so that the induced flow travels through them; to this end, they can be disposed in the branch pipe 16.

Figure 2:
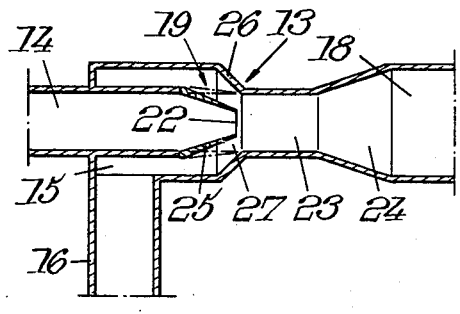
FIG. 2 shows another embodiment of the engine.

In the embodiment shown in FIG. 2, the adjusting means 19 comprise a variable neck 22 traversed by the driving flow in the ejector 13, so that the ejection speed of the fresh air may be adjusted.

The variable neck 22 and the mixture region 23 can be disposed so that the adjusting means 19 comprise throttle means disposed so that the induced flow travels through them, and also comprise a variable neck through which the driving flow can travel. For example, as shown in FIG. 2, the variable neck 22 can have flaps 25 which together define neck 22 and which cooperate with wall 26 to define throttle means limiting a variable annular flow cross-section 27. Consequently, the cross-section of the variable neck 22 (through which the driving flow of fresh air travels) is minimum when the annular variable cross-section 27 (through which the induced flow of hot gases travels) is maximum; conversely, the cross-section of the variable neck 22 is maximum when the annular variable flow cross-section 27 is zero.

Figure 3:
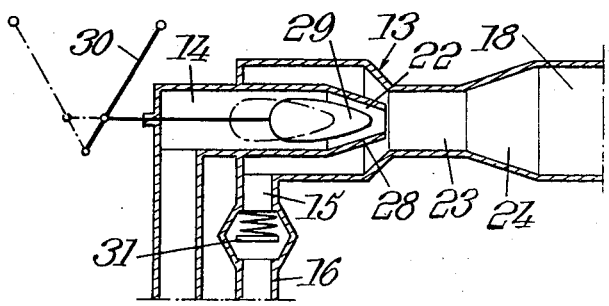
FIG. 3 shows a modification of the engine shown in FIG. 2.

In the embodiment shown in FIG. 3, in which like reference numbers denote the same components as in FIG. 2, the variable neck 22 comprises a convergent nozzle 28 in which a core 27 connected to operating means 30 is axially movably mounted. A non-return check valve 31 is disposed in the branch pipe 16 so as to prevent backflow of air to the gas intake 17 and to shut off the branch pipe 16 if the underpressure produced by the driving flow of fresh air becomes insufficient to prevent backflow of fresh air into the branch pipe 16.

In FIG. 3, continuous lines show the position of core 29 at which the underpressure produced by the driving flow of fresh air is maximum, with the check valve 31 is open, and broken lines show the position of core 29 when the underpressure produced by the driving flow of fresh air is at a minimum (valve 31 being then closed).

Figure 4:
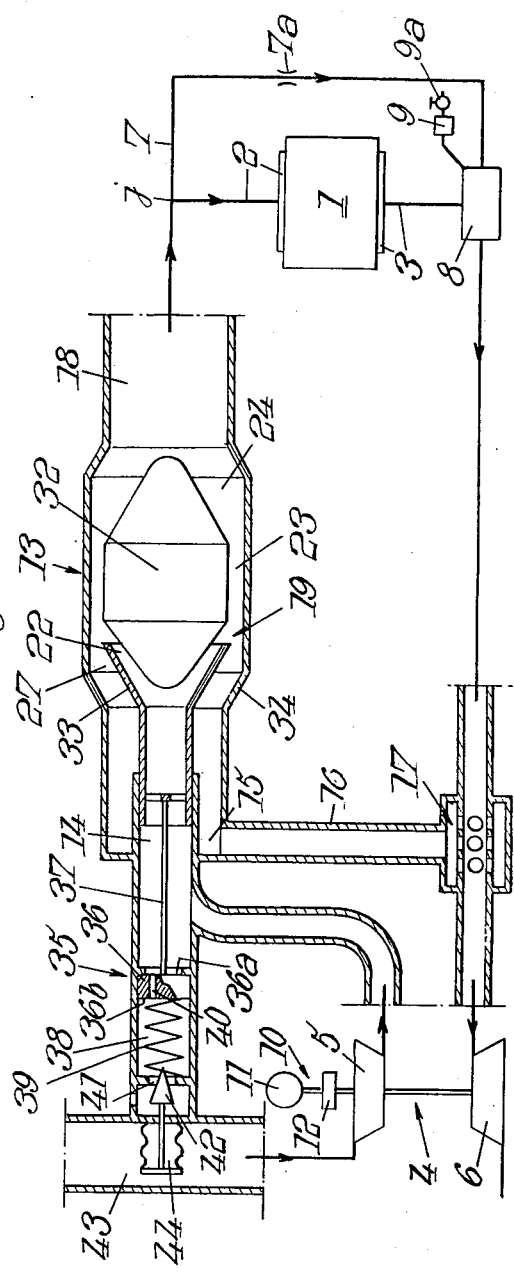
FIGS. 4 and 5 are diagrams of another embodiment of the engine.
Figure 5:
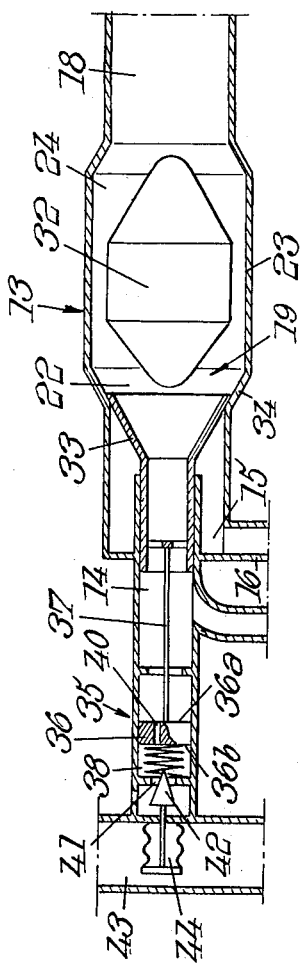

FIGS. 4 and 5 show more elaborate embodiment of the invention; the driving flow again occurs through a variable neck 22 and the driven gas flow travels through throttle means having a variable annular flow cross-sectional area 27.

The ejector 13 comprises a stationary streamlined axial member 32, a flared axially movable duct 33 cooperating with member 32 to define neck 22, and a stationary outer duct 34 cooperating with duct 33 to define the variable annular cross-section 27. The angle at the apex of member 32 is greater than the angle at the apex of member 33.

As in the embodiment illustrated in FIG. 2, the cross-sectional area of neck 22 is minimum when the annular variable flow cross-section 27 is maximum (FIG. 4) and the cross-section of neck 22 is maximum variable section 27 is zero (FIG. 5).

Referring to FIGS. 4–5, duct 33 is connected to a control mechanism 35 which comprises pilot means sensitive to the air pressure delivered by compressor 5 so that when the pressure increases, the cross-sectional area 27 decreases and the cross-sectional area 22 increases.

The pilot means illustrated on FIG. 4 comprise a piston 36 connected by a rod 37 to duct section 33; the front surface 36a of piston 36 is subjected to the pressure delivered by compressor 5 whereas the rear surface 36b is subjected to the action of a pilot pressure in a chamber 38 and to the force of a return spring 39. The pilot pressure is intermediate between the pressure delivered by compressor 5 and ambient pressure and is adjusted by a bleed circuit: chamber 38 is connected via a calibrated passage of constant cross-section 40 (which can be formed in piston 36) to the pressure delivered via compressor 5, and via a restriction 41 of adjustable cross-section to atmosphere.

The cross-sectional area of restriction 41 is varied by a conical element or needle 42, the position of which depends on the temperature of the ambient air drawn by compressor 5 so that the cross-section of nozzle 41 increases if the ambient temperature increases and the cross-section of nozzle 41 decreases if the ambient temperature decreases. A thermometer capsule 44, the movable part of which is connected to conical element 42, is disposed in the inlet pipe 43 of compressor 5.

Under these conditions, therefore, the position of the sliding duct section 33 controlling the proportion of the flow of hot gases which is recycled responsive to the pressure of the air delivered by compressor 5 and also to the temperature of the air drawn by compressor 5. Consequently, the proportion of hot gases which is recycled decreases when the temperature delivered by compressor 5 increases.

Figure 6:
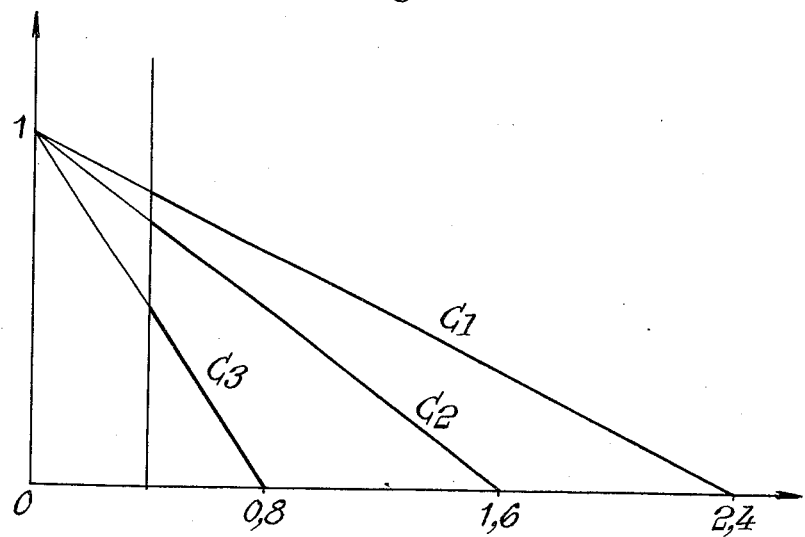
FIG. 6 is a graph showing the manner of operation of the engine illustrated in FIGS. 4 and 5.

FIG. 6 shows a graph wherein the abscissa shows the pressure delivered by compressor 5 (expressed in bars) and the ordinate shows the cross-sectional area provided for the recycled hot gases, i.e., the variable annular flow cross-section 27 (the value 1 denoting the fully open cross-sectional area).

When compressor 5 is at rest, the pressure is the same on both sides of piston 36 and the return spring 39 pushes the sliding duct 33 into a position at which the variable neck 22 has a minimum cross-sectional area and the variable annular flow cross-section 27 is maximum. In proportion as the power of engine 1 increases, i.e., in proportion as the pressure delivered by compressor 5 increases, the proportion of hot gases which is recycled decreases at a rate varying inversely with the pressure in chamber 38, i.e., directly with the temperature of the air sucked by compressor 5.

Curves $C_1$, $C_2$ and $C_3$ are for ambient temperatures of $-30°$ C, $0°$ C and $+30°$ C respectively.

In order to ensure that, below a certain limit value, the flow rate of recycled hot gases is zero (when branch 16 is closed), a safety device can be provided which operates above a supercharging pressure, which is predetermined and may depend on the ambient temperature. The safety device provides an alarm if, due to faulty operation of the adjusting means, the branch pipe has not closed although the operating conditions are such that recycling must stop. The safety device, which comprises, e.g., electric contacts, can trigger an alarm signal such as a tell-tale lamp, to warn the engine operator of the fault. The operator then knows that he must not load the engine any further and he must check the means controlling the input of recycled gases. In another embodiment, the safety device may automatically act on the means adjusting the amount of fuel injected into the engine, thus limiting this amount.

It still appears from FIG. 4 that, at a given value of the pressure delivered by compressor 5, the variable nozzle 41 (the cross-section of which is controlled by thermometer capsule 44) forms a "movable abutment" for the assembly including the sliding duct section 33.

Figure 7:
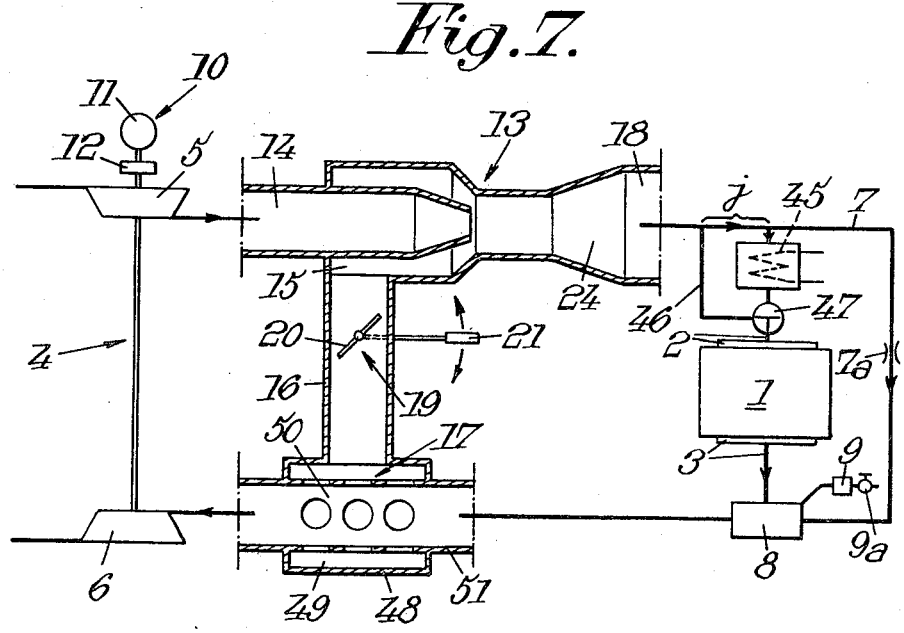
FIG. 7 shows an engine similar to that shown in FIG. 1 but also comprising an air cooler.

FIG. 7, in which like references denote the same components as in FIG. 1, shows another embodiment which comprises a cooler 45 disposed upstream of the intake manifold 2 and adapted, under normal conditions, to cool the air supplied by compressor 5 before it enters the engine. Advantageously, during starting and idling operation, cooler 45 is short-circuited by a bypass pipe 46 and three valve means 47 which are disposed so as to prevent the recycled hot gases from entering and fouling cooler 45. The valve means 47 may advantageously be constrolled by the same device as closes the branch 16, so that the bypass duct 46 and the branch 16 are simultaneously closed.

The gas intake 17 may advantageously comprise a sleeve 48 defining an annular chamber 49 connected to the sampling duct 16, sleeve 47 surrounding a perforated region 50 of duct 51 connecting combustion chamber 8 to turbine 6.

Figure 8:
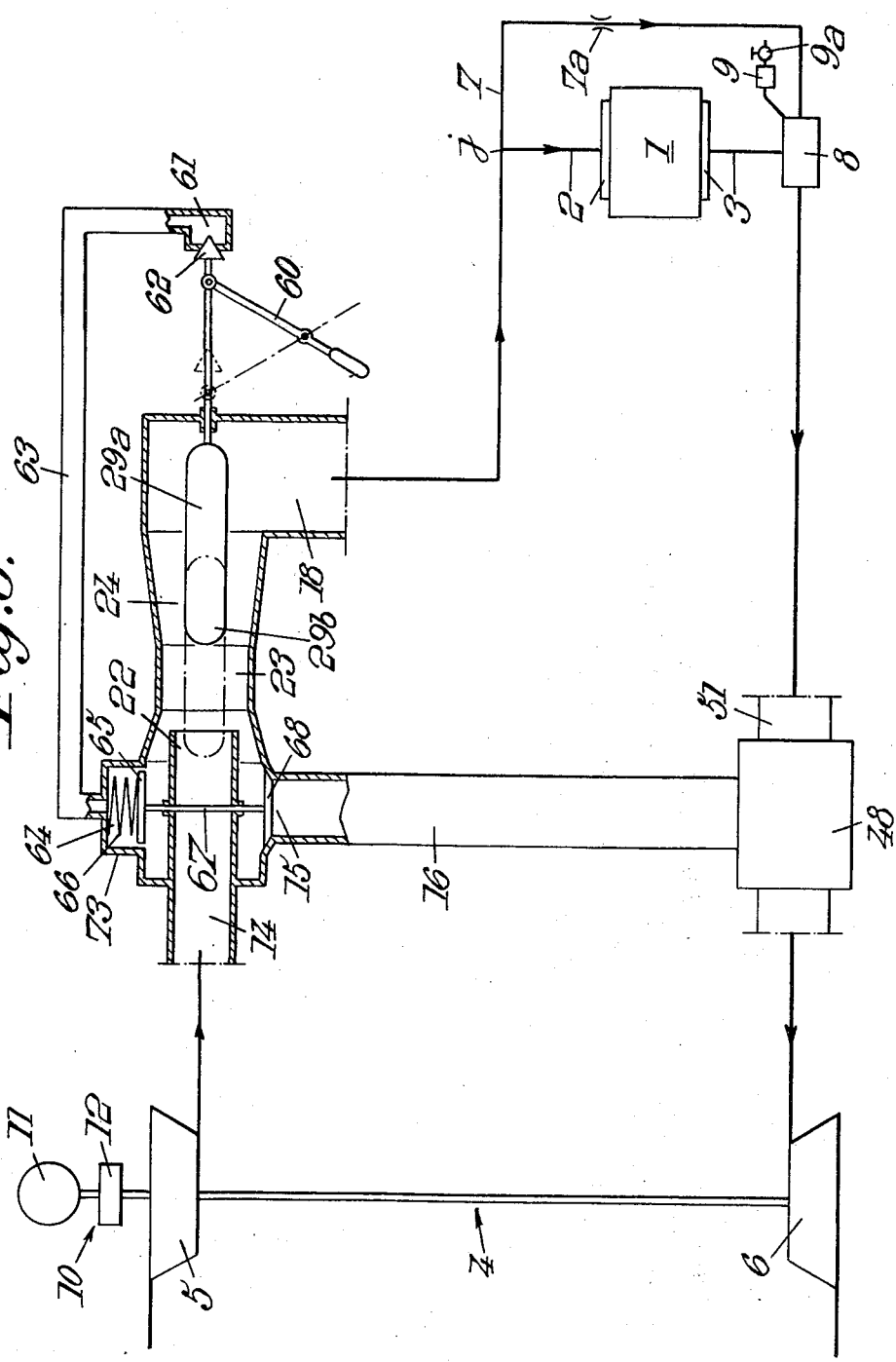
FIG. 8 shows still another embodiment of the invention.

FIG. 8 shows an embodiment wherein the air inlet 14 is a pipe having a constant cross-section and the variable neck 22, through which the driving flow travels, is limited by an axially movable cylindrical core 29a which has a diameter not less than that of the constant cross-section duct and which has a streamlined front end 29b. Core 29a is connected to a control device 60 for varying its position with respect to the air intake 14.

The branch pipe 16 is closed by an "on-off" device comprising a poppet valve member 68 disposed in the hot-gas intake 15. Valve member 68 is connected by a stem 69 to a control piston 65. Piston 65 is slidably non-sealingly received in a cylinder 73, forming a chamber 64 which can be at the pressure delivered by compressor 5.

Chamber 64 is connected by a duct 63 to chamber 61 which can be connected to atmospheric pressure by a passage controlled by a needle valve 62 secured to the control device 60; needle valve opens as soon as core 29a is moved towards the air intake 14 from its rest position.

When chamber 61 is closed by needle valve 62, the pressure delivered by compressor 5 prevails on both sides of piston 65 which, under the action of a spring 66, forces valve 68 against its seat and thus closes the branch pipe 16.

As soon as chamber 61 is connected to atmosphere, provided the cross-section of the connection is large with respect to the clearance between piston 65 and cylinder 66, the pressure in chamber 64 rapidly decreases and valve 68 is moved away from its seat.

Core 29a can penetrate by an adjustable distance into the air intake 14, thus varying the cross-section of neck 22 and consequently regulating the speed of the driving flow of the ejector 13.

If no cycling is required, the core 29a is retained in its rest rear position in the diffuser zone 24. At the same time, needle valve 26 closes chamber 21 and spring 66 moves valve 68 to the position at which it closes duct 15.

Under the last mentioned conditions, when core 29a is at its rear position (a position which it occupies when the engine operates under normal conditions) the cross-sectional area provided for the supercharging air flow does not suffer any local decrease, which would produce a pressure drop.

An engine constructed according to the invention may be operated as follows.

Before the installation starts, the adjusting means 29 acting on the ratio between the induced flow (hot gases) and the driving flow (fresh air) are held in a position at which the driving flow is at a maximum and the induced flow is zero; the turbocompressor group is started before starting the engine 1, the combustion chamber 5 being supplied with fuel at a sufficient rate for unit 2 to operate independently; the adjustment means 19 are released, whereupon the driving flow of fresh air can start recycling the hot gases forming the induced flow. Simultaneously, when the engine comprises a cooler 45, the valve 47 is actuated so as to prevent the recycled hot gases from travelling through the cooler. The pressure of the air delivered by the compressor and the proportion of recycled hot gases are respectively regulated by means 9, 9a supplying fuel to the combustion chamber 8 and by the adjustment means 19, so that the pressure and temperature of the gaseous mixture entering the engine are high enough for automatic ignition to occur in the engine cylinders at the end of the compression stroke; last, engine 1 is cranked and progressively loaded.

The adjustment means 19 stop the recycling of hot gases when the air in the engine intake manifold 2 is at a sufficiently high pressure and temperature for self ignition, simultaneously, when the engine comprises a cooler 45, the distribution means 47 is moved so that the supercharging air can travel through cooler 45.

The preceding description relates to an installation comprising starting means for starting the turbocompressor unit before the engine is cranked. Of course, such means are not indispensible and are only one possibility of starting the engine. Although the invention facilitates starting of the engine, it also applies to idling or low-power operation and to installations where the engine is started by any other suitable means.

I claim:
1. A power unit comprising:
an internal combustion engine having variable volume combustion chambers,
a turbocompressor supercharging unit having a compressor and a turbine, the inlet of said turbine being connected to receive the exhaust gas of said engine,
continuously open bypass conduit means having an inlet and an outlet connected to flow the air delivered by said compressor and not drawn by the engine to the inlet of said turbine with a pressure loss which, if appreciable, is substantially independent of the ratio of the flow rate traversing said bypass conduit means to the air flow delivered by the compressor,
an auxiliary combustion chamber connected to the outlet of said bypass conduit means and to the exhaust of said engine and having an output connected to the inlet of said turbine,
ejector-diffuser means having a driving gas inlet connected to the outlet of said compressor to receive the total air flow from said compressor, a driven gas inlet and an outlet connected to the intake of said engine and to the inlet of said bypass conduit means,
branch pipe means connected between the outlet of said auxiliary combustion chamber and said driven gas inlet of said ejector-diffuser means,
and means for adjusting the ratio between a cross-sectional area on the driven gas flow path and a cross-sectional area in said branch pipe means.

2. A power unit according to claim 1, characterized in that the adjusting means are controlled responsive to at least one operating parameter of the engine.

3. A power unit according to claim 2, wherein said parameter is the compressor output pressure.

4. A power unit according to claim 1, wherein the adjusting means comprise throttle means having a variable flow cross-section and connected to be traversed by the driven gas flow.

5. A power unit according to claim 1, wherein the adjusting means comprise a variable neck disposed in the ejector device so that the driving gas flow travels through it and adapted to adjust air ejection speed.

6. A power unit according to claim 1, wherein the adjusting means comprise throttle means arranged to be traversed by the driven gas flow and a variable neck arranged to be traversed by the driving gas flow.

7. A power unit according to claim 1, having means for controlling the adjusting means so as to vary the ratio between the driven gas flow and the driving gas flow between a maximum value and a zero value and means for adjusting the maximum value of said ratio and the value of the supercharging pressure corresponding to the zero value of said ratio in dependence on the ambient temperature, so that the maximum value and the aforementioned pressure value increase if said ambient temperature decreases.

8. A power unit according to claim 6, wherein the variable neck is limited by flaps which also cooperate with a wall of the ejector device to define said throttle means having a variable annular flow cross-section for the driven gas flow, so that when the variable neck has a minimum cross-section, the annular variable flow cross-section is at a maximum and, vice versa, when the variable neck has a maximum cross-section, the annular variable flow cross-section is zero.

9. A power unit according to claim 6, wherein the variable neck comprises a convergent conduit, an axially movable core in said convergent conduit, check valve means disposed in the branch pipe so as to block it when the underpressure at the intake of the engine becomes insufficient to prevent fresh air from flowing back into the branch pipe.

10. A power unit according to claim 1, wherein the ejector means comprises a stationary central member, a flared axially movable duct section cooperating with the central member to define the variable neck, and a stationary outer duct cooperating with the flared duct section to define an annular cross-sectional flow area for the driven flow, the angle at the apex of the sectional central member being greater than the angle at the apex of the flared duct section, so that when the variable neck cross-section is at a minimum, the annular variable flow cross-section is at a maximum and, vice versa, when the variable neck cross-section is at a maximum, the variable annular flow cross-section is zero.

11. A power unit according to claim 10, wherein the duct section is connected to an actuating mechanism comprising pilot means sensitive to the pressure delivered by the compressor, so that the variable annular air flow cross-sectional area decreases and so that the cross-sectional area of the variable neck increases when the aforementioned pressure increases.

12. A power unit according to claim 11, wherein the pilot means comprises a piston connected to said duct section and having a front surface subjected to the pressure delivered by the compressor and a rear surface subjected to the pilot pressure and to the force of a return spring, the pilot pressure being controlled responsive to the pressure delivered by the compressor and adjustable between the later pressure and the ambient pressure.

13. A power unit according to claim 12, wherein the pilot pressure is developed in a chamber connected to the compressor output via a fixed restriction and connected to ambient pressure via a nozzle of variable cross-sectional area.

14. A power unit according to claim 13, wherein the cross-sectional area of the variable nozzle is adjusted in dependence on the ambient temperature of the air drawn by the compressor, so that cross-section of the variable nozzle increases if the ambient temperature increases, and the cross-section of the variable nozzle decreases if the ambient temperature decreases.

15. A power unit according to claim 14, wherein the cross-sectional area of the variable nozzle is adjusted by a thermometer capsule, the moving part of which is connected to a movable needle of variable cross-section, the thermometer capsule being disposed in the inlet of the compressor.

16. A power unit comprising:
an internal combustion engine having variable volume combustion chambers,
a turbocompressor supercharging unit having a compressor and a turbine, the inlet of said turbine being connected to receive the exhaust gas of said engine,
bypass conduit means having an inlet and an outlet connected to flow the air delivered by said compressor and not drawn by the engine to the inlet of said turbine,
an auxiliary combustion chamber connected to the exhaust of said engine and to the outlet of said bypass conduit means for receiving the exhaust gas from said engine and air from said compressor,
ejector diffuser means having a driving gas inlet, a driven gas inlet and an outlet,
conduit means connecting the outlet of said compressor to the driving gas inlet of said ejector-diffuser means and connecting the outlet of said ejector-diffuser means to the intake of said engine,
branch pipe means connecting the outlet of said combustion chamber to the driven gas inlet of said ejector diffuser means,
and means responsive to the output pressure of said compressor for increasing the ratio between the driving gas rate of flow and the driven gas rate of flow as the pressure delivered by the compressor increases and to cut off delivery of the driven gas flow when the pressure delivered by the compressor exceeds a predetermined value.

* * * * *